US012271312B2

(12) United States Patent
Kipp

(10) Patent No.: US 12,271,312 B2
(45) Date of Patent: *Apr. 8, 2025

(54) METHOD AND SYSTEM FOR EFFICIENT COMMUNICATION AND COMMAND SYSTEM FOR DEFERRED OPERATION

(71) Applicant: OXIDE INTERACTIVE, INC., Timonium, MD (US)

(72) Inventor: Timothy James Kipp, Fallston, MD (US)

(73) Assignee: Oxide Interactive, Inc., Timonium, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,342

(22) Filed: Nov. 22, 2023

(65) Prior Publication Data

US 2024/0086322 A1 Mar. 14, 2024

Related U.S. Application Data

(63) Continuation of application No. 17/969,511, filed on Oct. 19, 2022, now Pat. No. 11,860,785, which is a continuation of application No. 16/734,257, filed on Jan. 3, 2020, now Pat. No. 11,507,506, which is a continuation of application No. 16/120,856, filed on Sep. 4, 2018, now abandoned, which is a continuation of application No. 15/710,484, filed on Sep. 20, 2017, now Pat. No. 10,095,627, which is a continuation of application No. 15/368,214, filed on Dec. 2, 2016, now Pat. No. 9,798,671, which is a continuation of application No. 15/013,758, filed on Feb. 2, 2016, now Pat. No. 9,542,319, which is a continuation of application No. 14/155,833, filed on Jan. 15, 2014, now Pat. No. 9,256,543.

(51) Int. Cl.
| | |
|---|---|
| G06F 12/00 | (2006.01) |
| G06F 12/0804 | (2016.01) |
| G06F 12/0868 | (2016.01) |
| G06F 12/0888 | (2016.01) |

(52) U.S. Cl.
CPC ...... *G06F 12/0804* (2013.01); *G06F 12/0868* (2013.01); *G06F 12/0888* (2013.01); *G06F 2212/1024* (2013.01)

(58) Field of Classification Search
CPC ............ G06F 12/0804; G06F 12/0868; G06F 12/0888; G06F 2212/1024
See application file for complete search history.

(56) References Cited

U.S. PATENT DOCUMENTS

2014/0149680 A1* 5/2014 Fleischer ............ G06F 12/0888
711/138

* cited by examiner

*Primary Examiner* — John A Lane
(74) *Attorney, Agent, or Firm* — ICE MILLER LLP

(57) ABSTRACT

A method and system for efficiently executing a delegate of a program by a processor coupled to an external memory. A payload including state data or command data is bound with a program delegate. The payload is mapped with the delegate via the payload identifier. The payload is pushed to a repository buffer in the external memory. The payload is flushed by reading the payload identifier and loading the payload from the repository buffer. The delegate is executed using the loaded payload.

20 Claims, 8 Drawing Sheets

METHOD AND SYSTEM FOR EFFICIENT COMMUNICATION AND COMMAND SYSTEM FOR DEFERRED OPERATION

CROSS-REFERENCE TO RELATED APPLICATIONS

This application is a continuation of U.S. application Ser. No. 17/969,511, filed Oct. 19, 2022, allowed, which is a continuation of U.S. application Ser. No. 16/734,257, filed Jan. 3, 2020, U.S. Pat. No. 11,507,506, which is a continuation of U.S. application Ser. No. 16/120,856, filed Sep. 4, 2018, now abandoned, which is a continuation of U.S. application Ser. No. 15/710,484, filed Sep. 20, 2017, now issued as U.S. Pat. No. 10,095,627, which is a continuation of U.S. application Ser. No. 15/368,214, filed Dec. 2, 2016, now issued as U.S. Pat. No. 9,798,671, which is a continuation of U.S. application Ser. No. 15/013,758, filed Feb. 2, 2016, now issued as U.S. Pat. No. 9,542,319, which is a continuation of U.S. application Ser. No. 14/155,833, filed Jan. 15, 2017, now issued as U.S. Pat. No. 9,256,543, each of which is hereby incorporated by reference herein in its entirety.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to an efficient processor core operation, and more particularly, to a command system to efficiently use memory cache of a processor unit.

BACKGROUND

Current processing systems have multiple processing cores to provide parallel processing of computational tasks, which increases the speed of completing such tasks. In multi-core systems, it is desirable to perform multi-threading in order to accomplish parallel processing of programs. Multi-threading is a widespread programming and execution model that allows multiple software threads to exist within the context of a single process. These software threads share the resources of the multi-core system, but are able to execute independently. Multi-threading can also be applied to a single process to enable parallel execution on a multi-core system. This advantage of a multi-threaded program allows it to operate faster on computer systems that have multiple CPUs, CPUs with multiple cores, or across a cluster of machines because the threads of the program naturally lend themselves to concurrent execution.

However, programs executed over multiple cores are limited by the processing speed of the processing cores as well as any conflicts over shared resources such as external memory in the form of RAM. Processing cores such as CPUs typically include high speed internal memory, termed cache memory, which is used to speed up access to data and instructions used by the CPU. Memory caches save computationally expensive reads to RAM. Memory caches typically function by loading data that may be next used by the CPU. Whether data stored in the cache is useful to the CPU is sometimes random, as the CPU will first look to needed data in the cache and then in RAM.

Memory latency, which is the length of time between the receipt of a read request and its release of data corresponding with the request, is a key consideration of any software program that attempts to run in an efficient manner. In a multi-threaded environment this consideration is even more critical since the more threads that are running, the greater the likelihood that this latency will effect overall performance. This is especially true in the case where two different threads are attempting to write and/or read from a shared memory location in RAM. This latency is a critical factor when considering the run time cost of transferring state data from one location in program memory to another.

CPU memory cache efficiency is another important consideration. As explained above, the cache memory is a fast, but extremely limited, local memory storage for a processor. Data from external memory is copied into the CPU cache for two main purposes. One is to provide the memory for the actual CPU instructions that are to be executed. This is commonly referred to as the instruction cache. The other cache is commonly referred to as the program data cache. The program data cache is where the program state data that instructions are paired with is stored. While various CPUs may handle the memory cache differently, there is a uniform issue in that the instruction cache and the data cache are an extremely limited resource. Due to this, it is extremely important to utilize these caches in an efficient manner. In addition to being an extremely limited resource, the performance of both the instruction cache and the data cache is gated by how fast the processor can transfer data from main memory into the cache for use by the processor. In this way, the performance of a software program is tied to both efficient instruction cache utilization and data cache utilization, as well as, the latency inherent in updating these resources. To efficiently communicate or transfer data and commands within a multi-threaded program it is desirable to minimize the required updates to the instruction cache and the data cache.

Thus, there is a need for defining an efficient framework for communicating program state and commands to various functions from a program executed by a processing unit by minimizing required updates to the instruction cache and data cache. There is a further need for a command module to bind delegates from a program to data in the form of payloads for later access for efficient processor execution using the data. There is a further need for a command module which allows necessary resources to be accessible in the cache when program delegates are loaded.

SUMMARY

According to one example, a processing system for efficient execution of program functions is disclosed. The system includes a processor unit including a processor and cache memory. An external memory is coupled to the processing unit. The external memory includes a payload repository including one repository buffer. A direct command module loads a payload in the payload repository and binds the payload with a program delegate to flush the payload from the cache memory when the associated program delegate is to be executed by the processing unit, bypassing accesses to the cache memory.

Another example is a method for efficiently executing a delegate of a program by a processor unit coupled to an external memory. A payload is bound with a program delegate. The payload is associated with the delegate via a payload identifier. The payload is pushed to a repository buffer in the external memory. The payload is flushed by reading the payload identifier and loading the payload from the repository buffer. The delegate is executed using the loaded payload.

Another example is a non-transitory, machine-readable medium having stored thereon instructions for executing a delegate from a program. The stored instructions comprise machine executable code, which when executed by at least one machine processor, causes the machine processor to bind a payload with a program delegate. The instructions cause the machine processor to map the payload with the delegate via a payload identifier. The instructions cause the machine processor to push the payload to a repository buffer in the external memory. The instructions cause the machine processor to flush the payload by reading the payload identifier and loading the payload from the repository buffer. The instructions cause the machine processor to execute the delegate using the loaded payload.

Additional aspects of the invention will be apparent to those of ordinary skill in the art in view of the detailed description of various embodiments, which is made with reference to the drawings, a brief description of which is provided below.

Figure 1A:
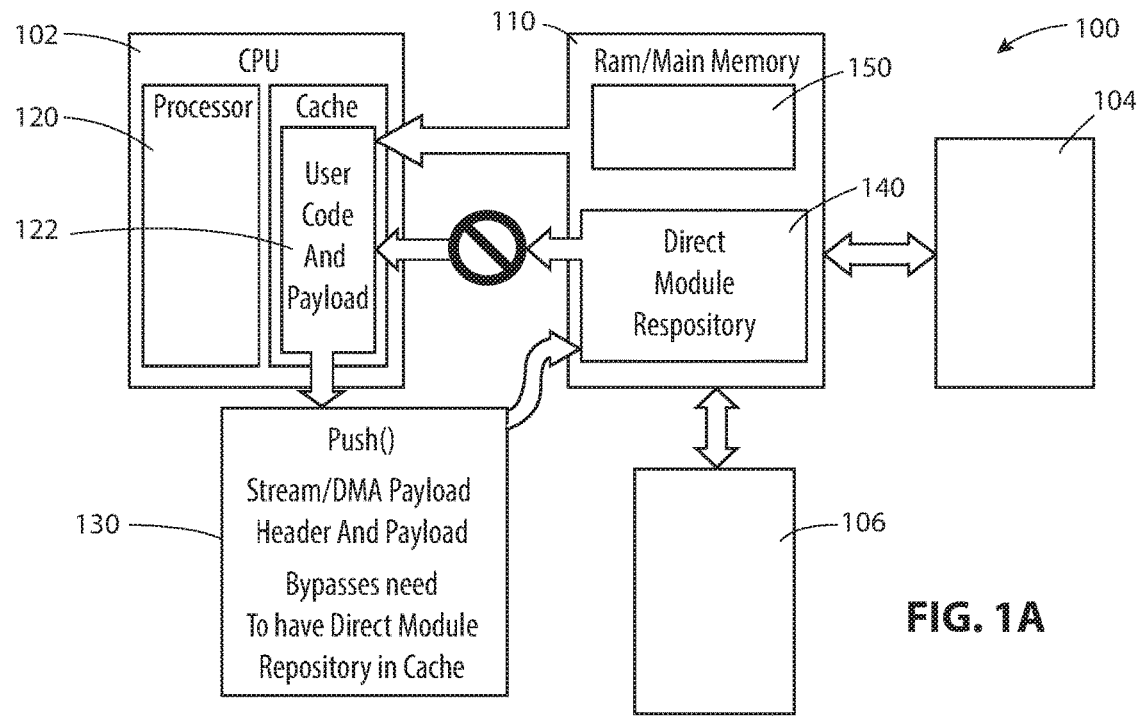
FIG. 1A is a block diagram of a multi-core system with a typical processing unit with associated cache memory and a command module for efficient execution of program delegates.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1A shows a multi-core processing system 100 that includes a series of cores or processor units 102, 104, and 106. The system 100 may include any device that includes multiple processing cores such as a multi-core CPU, GPU, and APU and have any number of processors that operate independently from each other. Each of the processor units 102, 104, and 106 may operate in parallel to perform program functions asynchronously. Each of the processor units 102, 104, and 106 is coupled to a common external memory 110, which is RAM in this example. Each of the processor units 102, 104, and 106 may read data stored in an area of the common memory 110 when executing programming tasks and functions or rely on faster internal cache memory.

The multi-core processing system 100 executes a program by distributing the tasks or functions in the program among worker threads associated with the processor units 102, 104, and 106. FIG. 1A shows a detailed block diagram of the processor unit 102. The other processor units 104 and 106 are not shown but may have similar components. The processor unit 102 includes processor circuitry 120 that accesses an internal cache memory 122. As is understood, the cache memory 122 is extremely fast and allows efficient execution of instructions such that if data is required by the instructions it can be fetched from the cache 122 in comparison to fetching such data from the common external memory 110.

A command system 130 provides an interface with the common external memory 110. As will be explained, the command system 130 allows the efficient use of internal cache memory by minimizing memory transfer based on calls to program functions made by the processor unit 102. This system facilitates the efficient transfer and distribution of program state data and related commands within a processor unit such as the processor unit 102 of a multi-core system 100 in FIG. 1A for deferred operations from a program. In this example the command system 130 is a program that is run by the processing unit 102 as part of the operating system. The command system 130 may be executed by any appropriate processing unit or in a separate dedicated chip.

Figure 1B:
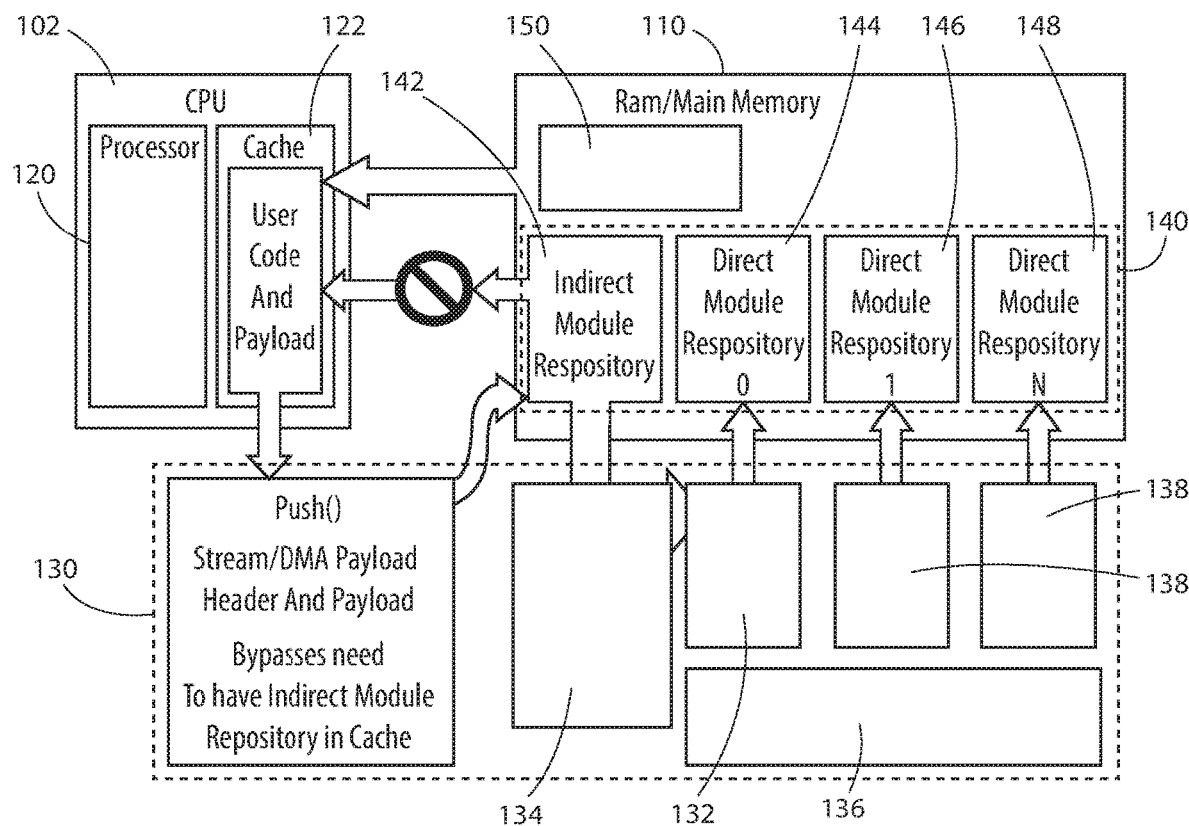
FIG. 1B is a block diagram of the processing unit and the command module, which allows efficient use of the cache memory to execute the program delegates.

As shown in FIG. 1B, the command system 130 includes a direct state data and command module 132, an indirect state data and command module 134 and program logic 136, which binds the command modules 132 and 136 together. The direct state data and command module 132 is referenced as the "direct command module" and the indirect state data and command module 134 is referenced as the "indirect command module." Commands and state data may be treated similarly as both reside in external memory 110. Other direct modules, such as direct modules 138, may be used to handle data for different delegates as will be explained below. The indirect command module 134 is related to one or more direct modules such as the direct command modules 132 and 138.

The direct and indirect modules of the command system 130 access a payload repository area 140, which resides in an area of the external memory 110. The payload repository area 140 serves as storage for data payloads that are used by the command modules 132 and 134 to be loaded into the cache memory 122 based on user functions. The payload repository area 140 includes multiple payload repositories for each direct and indirect command module. In this example, the payload repository area 140 includes an indirect payload repository 142 and direct payload repositories 144, 146, and 148. The indirect payload repository 142 stores payloads of data required by the indirect command module 134. Each direct module such as the direct command modules 132 and 138 have a corresponding direct payload repository such as payload repositories 144 and 146 to store payloads of data. The payloads of data are used by functions of programs when executed by the processor unit 102.

The external memory 110 also stores programs for execution by the system 100. An example of such a program is a program 150 that includes various program functions that are executed by a processor unit or units in the system 100. The program functions are referenced as delegates as their execution is deferred. The program functions typically require access to commands and state data to be executed on one of the processor units such as the processor unit 102. As explained above, the time to access such commands and state data influences the speed of executing the function by the processing unit 102. The command system 130 minimizes the access time for command and state data by minimizing accesses to the internal cache memory 122.

The direct state data and command module 132 or "direct command module" is responsible for associating a payload repository buffer with a set of user defined CPU program instructions or delegates from the program 150, which operate on the state and command data stored within the payload repository buffer. This association may happen at run-time or compile time of the program 150. The payload stored in the payload repository buffer includes a payload header and a payload field that includes the actual payload. The payload may include commands and state data that are communicated and transferred between program functions of the program 150 and are selected depending on the requirements of the program function. This association between a payload and a CPU instruction based on a program function (delegate) is facilitated by the payload header, which is used to map the delegates to payloads associated with the direct command module 132 and used to reference the delegates.

Figure 2:
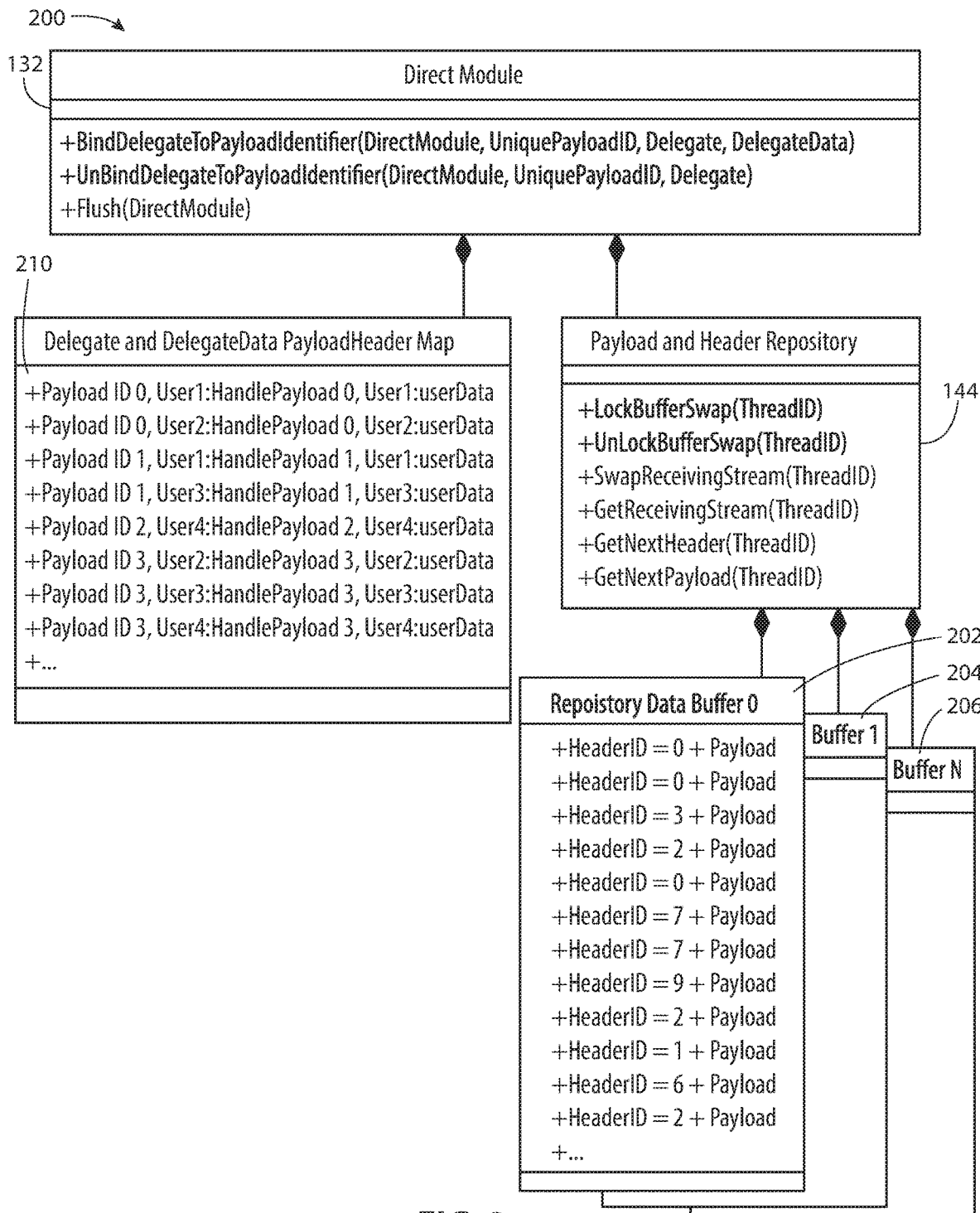
FIG. 2 is a diagram showing the direct command module in FIG. 1 in relation to the payload repository.

FIG. 2 shows a block diagram 200 of the direct command module 132 allowing access to the direct payload repository 144 in FIG. 1B. The direct payload repository 144 includes payload repository buffers 202, 204, and 206. Each payload repository buffer is numbered from buffer 0 (202) to buffer N (206). There may be any number of payload repository buffers between buffer 0 and buffer N depending on the payloads required for the program functions in a program such as the program 150. FIG. 2 shows that payloads are stored in the payload repository buffers 202, 204, and 206. The multiple payload repository buffers such as the payload repository buffer 202 allow the processor unit 102 to work asynchronously with other delegates since each payload repository buffer contains the necessary data to perform the function (delegate) independent of other delegates.

The payload header provides context with which the direct command module 132 can operate on and transfer payloads. The deferred program operation (delegate) used in conjunction with the payload may be any typical reference to program code of the program 150 including, but not limited, to static/global program methods and object member functions. The direct command module 132 also accesses delegates to create a payload header map 210 that associates payloads with specific delegates.

The direct command module 132 is associated with the functions of binding delegates, unbinding delegates, and flushes. The bind delegate to payload identifier function takes a user function or delegate of the program 150 and associates it with a payload ID header for a particular delegate arriving at the command system 130. The bind delegate function is expressed as:

BindDelegateToPayloadIdentifier(<DirectModule>, <uniquePayloadID>, <delegate>, <delegateData:Optional>);

The opposite unbind delegate function unbinds a delegate from a payload ID and disassociates the user function or delegate with the payload header ID. The unbind delegate function is phrased as:

UnBindDelegateToPayloadIdentifier(<DirectModule>, <uniquePayloadID>,<delegate>);

The flush function iterates through all of the current active stored payloads in the direct payload repository 144, reads the payload header IDs, and, using the map 210, makes the necessary command or state data of the payloads from the direct payload repository 144 in FIG. 1 available to the delegates. The flush function may be expressed as:

```
Flush(<DirectModule>)
{
  DirectModule.repository.LockBufferSwap( );// optional
  DirectModule.repository.SwapReceivingStream( );
  while(!DirectModule.repository.empty( ))
  {
    DirectModule::Repository::Header payloadHeader =
    DirectModule.repository.GetNextHeader( );
    DirectModule::Repository::Payload payload =
    repository.GetNextPayload( );
    DirectModule::Delegate delegate =
    DirectModule.LookUpBoundDelegate(payloadHeader);
    delegate.DoBoundMethod(payload);
  }
  DirectModule.repository.UnLockBufferSwap( );
}
```

As shown above, the flush function causes the direct command module 132 to iterate through all the currently active stored payloads in the payload repository buffers 202, 204, and 206, and, using the associated headers, makes the payload data required by the appropriate delegate available from the repository buffers thereby bypassing the cache memory 122. The flush function increases efficiency of delegate execution by minimizing memory accesses for both indirect and direct cache memory.

Figure 3:
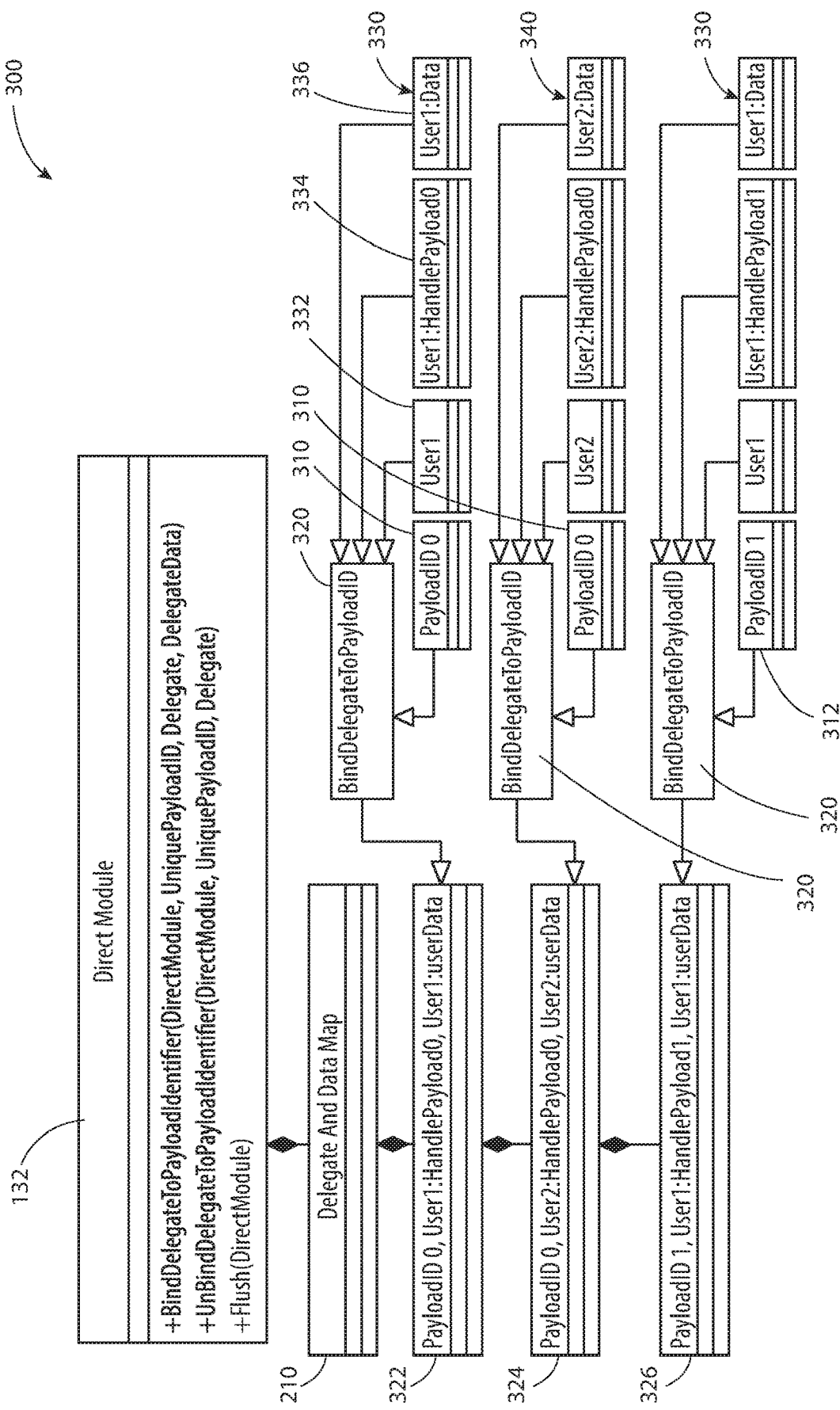
FIG. 3 is a flow diagram showing the process of binding a delegate to a payload by the direct module in FIG. 2.

The above described bind delegate function, BindDelegateToPayloadIdentifer( ) is responsible for associating a delegate referenced by the direct command module 132 with the payload ID header (uniquePayloadID field) of a payload having data needed to execute the delegate. The bind delegate function is shown in the flow diagram 300 in FIG. 3. The delegate and data map 210 in FIG. 2 is accessed by the direct command module 132 as shown in FIG. 3. The map 210 includes entries 322, 324, and 326 created by the bind delegate function (320). Each payload includes a payload ID header field such as the payload ID header field 310 for a first payload and a payload ID header field 312 for a second payload. The bind delegate function (320) binds a delegate 330, which is identified by a user field 332, a handle payload field 334, and a payload data field 336 to the payload ID field 310. As shown in FIG. 3, the first payload identified by the payload ID header field 310 is bound to the first delegate (user 1). The user field 332 and the user handle field 334 identify the delegate where the user field is an instance of a class while the user handle field is a function that is specific to the type of class to operate on an instance. The user data field 336 is an optional field that includes additional information such as whether the delegate should be included in a broadcast or flush function. The created entry 322 therefore binds the delegate 330 with the first payload identified by the payload ID field 310.

The same payload may be bound to other delegates. For example, in FIG. 3, the first payload as identified by the payload ID field 310 is also bound to a second delegate 340 with an associated user field, handle field, and user data field. The binding of the first payload to the second delegate 340 results in the creation of the entry 324 in the map 210.

Multiple payloads may be associated with a single delegate. For example, another payload such as a second payload is associated with the first delegate 330. This association is reflected in the creation of the entry 326 by the bind delegate function (320) in FIG. 3.

When payloads are stored within the direct payload repository 144 and associated with a delegate by the direct command module 132, their associated payload headers are used to find the correct delegate via the map 210 in FIG. 2 when the flush function is performed. On the above described flush function, the delegate is executed with the associated payload as an argument for the delegate.

Figure 4:
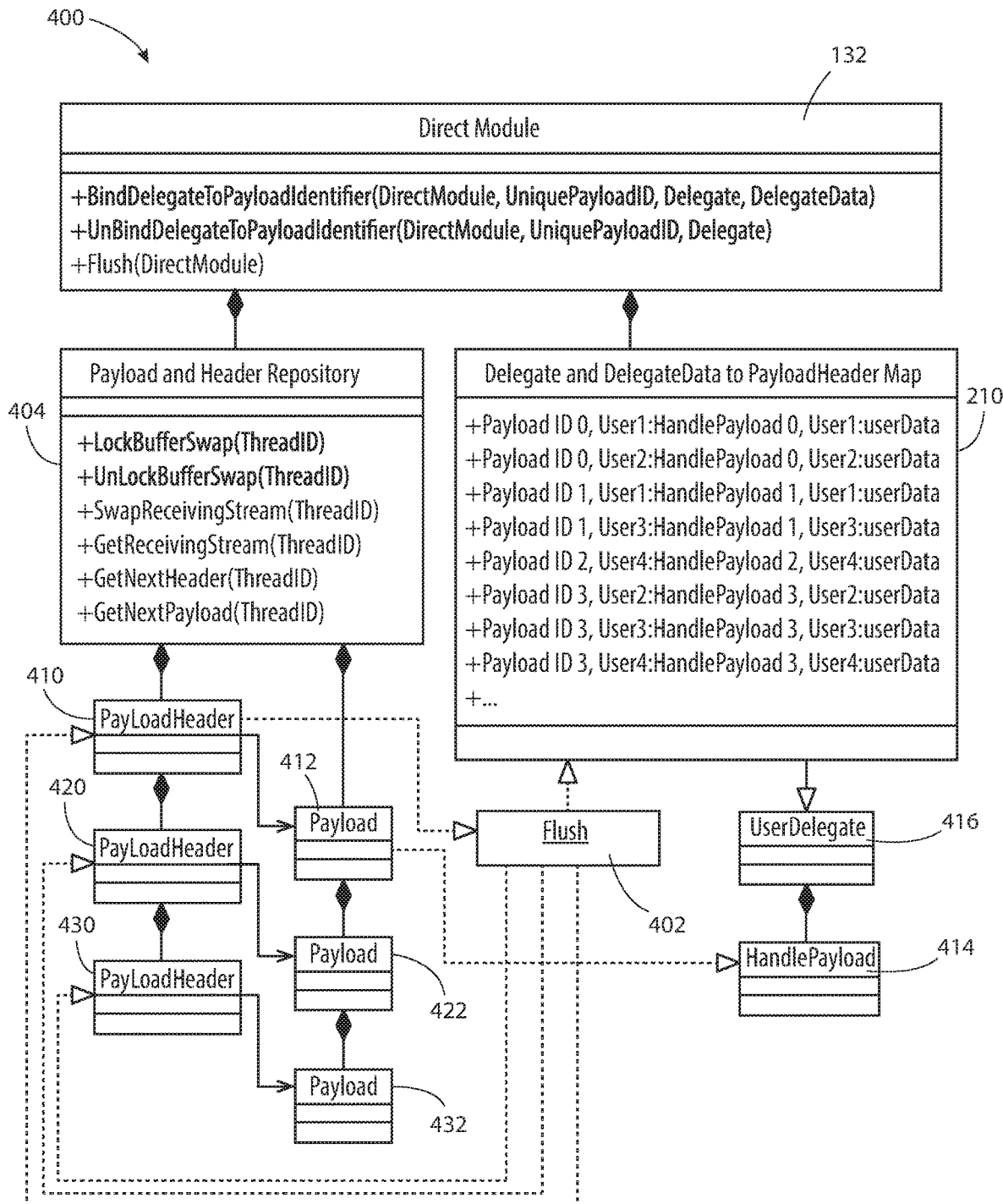
FIG. 4 is a flow diagram showing the sequence of a flush function executed by the direct module in FIG. 2.

FIG. 4 is a flow diagram 400 showing the execution of the flush function by the direct command module 132. In the flush function (402), the direct command module 132 reads the delegate to the payload header map 210 and uses the map 210 to access a payload repository buffer 404 in the direct payload repository 144. The flush function causes the direct command module 132 to read a payload ID header 410 from the payload repository buffer 404 and load a corresponding payload 412. The payload 412 is handled by a handle field 414 associated with a delegate 416 and made accessible to the delegate 416. The flush function continues to a next payload ID header 420 and loads a corresponding payload 422 and continues for each payload, such as the payload ID header 430 and corresponding payload 432 in the payload repository buffer 404, until the buffer is empty.

Additional state data, which may modify the behavior of the delegate or flush, may also be associated with each binding of a delegate and the payload header via a user data field such as the user data field 336. The data binding is optional and may be used during communication to augment the behavior of the flush function.

Figure 5:
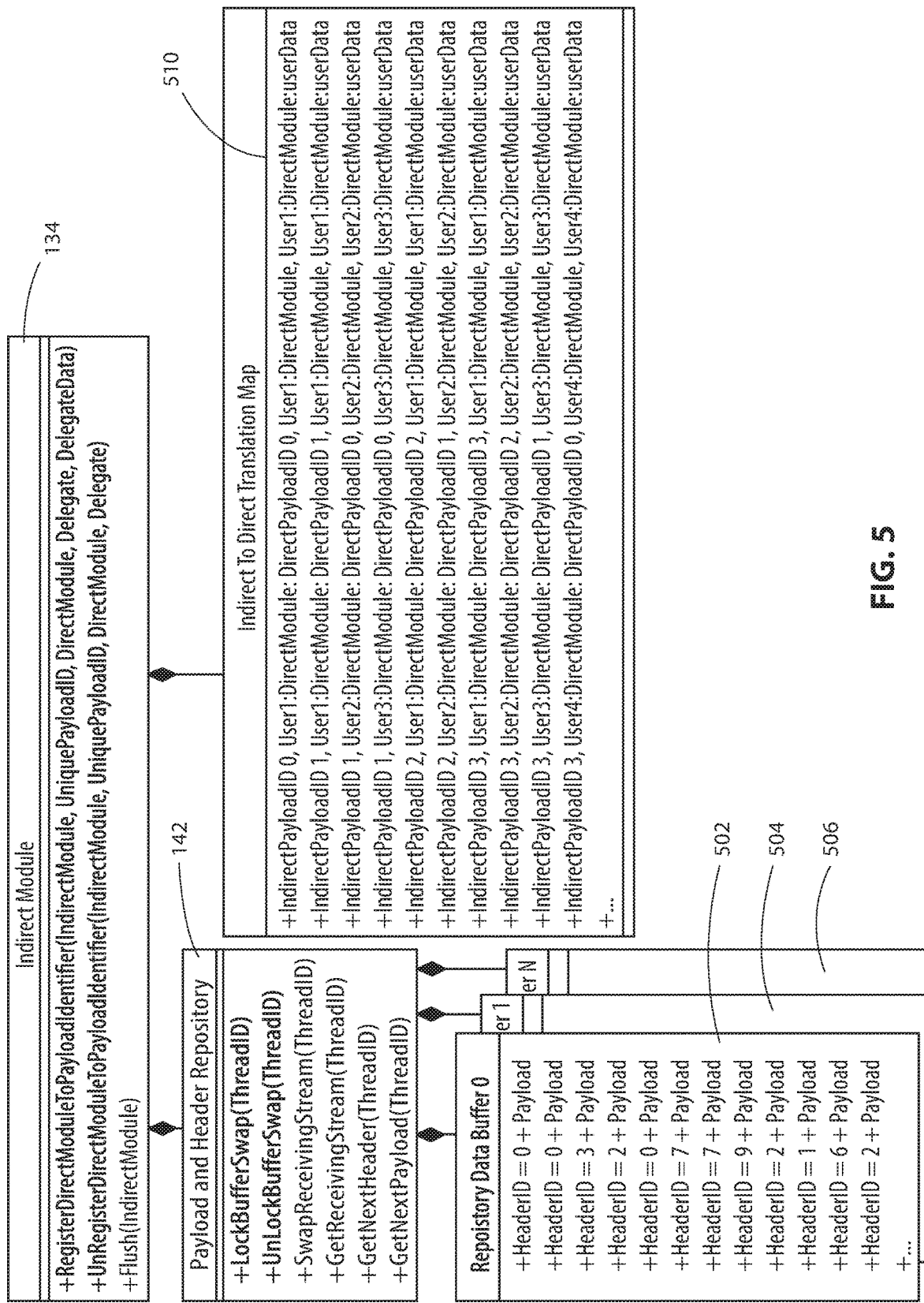
FIG. 5 is a diagram showing the indirect module in FIG. 1 in relation to the payload repository.

FIG. 5 shows a block diagram of the indirect command module 134 in FIG. 1. The indirect state data and command module or "indirect command module" 134 is responsible for associating the payloads in an indirect payload repository buffer such as those of an indirect payload repository such as the indirect payload repository 142 in FIG. 1B with one or more direct modules such as the direct command module 132 in FIG. 2. As shown in FIG. 5, the indirect payload repository 142 includes multiple payload repository buffers 502, 504, and 506. Similar to the direct module, there may be any number of payload repository buffers for the indirect command module 134. The indirect command module 134 creates and accesses an indirect to direct translation map 510. The indirect command module 134 stores a mapping of direct modules such as the direct command module 132 in FIG. 2 to specific payloads via additional data in the indirect to direct translation map 510, which is provided to the indirect command module 134 by the direct module 132 at the time of association. In this way the indirect command module 134 leverages some of the existing functionality from the payload repository of direct command modules, such as the direct command module 132, but offers additional indirect access to multiple direct command modules. The payload data may be completely streamed from the payload repository of the indirect command module to the payload repositories of the direct command modules. Additionally since the mapping from direct command modules to an indirect command module is stored in the local memory of the indirect command module, translation will be faster and more cache friendly. It also allows for the translated payload header for the direct command module to be streamed as well since it may be composed entirely off of data already in the cache from the translation map 510 associated with the indirect command module 134.

The indirect command module 134 is associated with functions including a register direct module to payload function, an unregister direct module to payload function, and a flush function. These functions are operated as follows. The register direct module to payload function may be called as follows:

```
RegisterDirectModuleToPayloadIdentifier(<IndirectModule>,
<uniquePayloadID>,
<DirectModule>,<Delegate>, <DelegateData:Optional>);
UnRegisterDirectModuleToPayloadIdentifier(<IndirectModule>,
<uniquePayloadID>,
<DirectModule>,<Delegate>);
Flush(<IndirectModule>)
{
IndirectModule.repository.LockBufferSwap( );// optional
IndirectModule.repository.SwapReceivingStream( );
while(!IndirectModule .repository.empty( ))
{
IndirectModule::Repository::Header payloadHeader =
IndirectModule.repository.GetNextHeader( );
IndirectModule::Repository::Payload payload = IndirectModule
.repository.GetNextPayload( );
DirectModule:: directModule =
indirectModule.GetRegisteredModules(payloadHeader);
while(directModule)
{
DirectModule::Repository::PayloadHeader dmPayloadHeader;
IndirectModule.Translate(dmPayloadHeader, payloadHeader,
directModule);
Push(directModule.repository, dmPayloadHeader, payload,
<ThreadID:Optional>);
DirectModule.repository.UnLockBufferSwap( );
}
}
IndirectModule.repository.UnLockBufferSwap( );
}
```

The register direct module to payload function, (RegisterDirectModuleToPayloadIdentifier), is responsible for associating a delegate and a direct module with a unique payload ID. Multiple direct module and payload pairs may be associated with a single unique payload identifier. This allows a single payload to be communicated to multiple direct modules.

Additional program state data may also be stored with each binding of the delegates to a direct module using a direct module unique ID (DirectModuleuniquePayloadID). This can be used by the flush function to modify its behavior.

The unregister direct module to payload function, (UnRegisterDirectModuleToPayloadIdentifier), will remove an associated delegate and direct module with a unique payload ID.

The flush function is responsible for iterating through all the currently active stored payloads and using the associated payload header, communicating the translated payload header (specific to each direct command module) and payload data to the repositories associated with direct command modules. As explained above, the flush functions performed by the direct command modules communicate the payload data to the associated delegates for execution. Due to the associated data stored when the direct module and delegate were registered, this communication may be executed via streaming or direct memory access (DMA) commands (based on the model or type of CPU) since the header for the payload of the indirect command module may be translated into headers consumable by the direct command modules in a small fixed local cache such as the cache 122. The resulting payload header is then streamed to each repository of the associated direct command module. The payloads themselves do not need translation, and as such may be streamed directly. This streaming is facilitated as the flush function only keeps track of the source and destination memory locations so the local cache 122 is not compromised.

Figure 6:
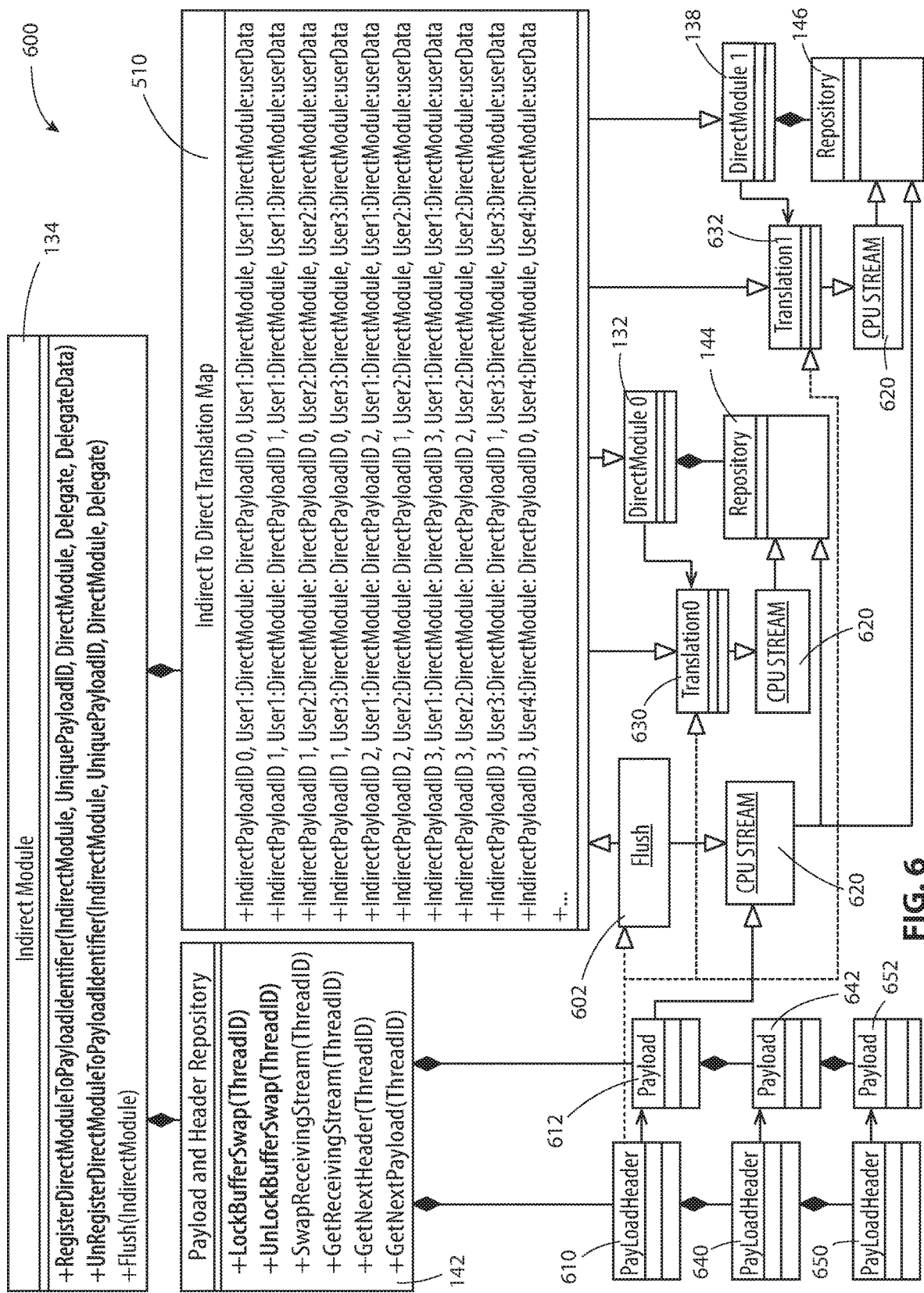
FIG. 6 is a flow diagram showing the sequence of a flush function executed by the indirect module in FIG. 5.

FIG. 6 is a flow diagram 600 of the flush function (602) performed by the indirect command module 134. The indirect command module 134 accesses the payload repository buffers of the indirect payload repository 142 and manages the indirect to direct translation map 510. The indirect command module 134 iterates through stored payloads in the indirect payload repository 142 and communicates a payload header ID 610 and the associated payload 612. The communication is accomplished by a stream to the processing unit 102 (620). A first translation (630) is performed that associates payloads with a first direct module such as the direct command module 132. A second translation (632) may be performed to associate payloads with a second direct module such as the direct module 138 in FIG. 1B. The flush function continues until all of the payloads and payload headers in the indirect payload repository 142, such as the payloads 640 and 650 and payload headers 642 and 652, have been assigned to a direct module.

Streaming is useful as the execution of a direct module delegate is typically deferred until the flush function is called by a direct module. In this way polluting the cache of the current CPU with the program memory of the destination program in addition to the program memory responsible for storing the delegate instructions may be avoided. This also avoids any additional memory access (and corresponding cache pollution) by deferring the execution of the delegate, which, in almost every case, will need to access additional program memory.

The payload repository area 140 used by both the direct and indirect command modules 132 and 134 is interchangeable and may be configured in multiple ways for different payload repositories depending on the program context. The payload repository area 140 is responsible for maintaining a section of program memory for payload repositories where storage of payloads and the associated payload headers associated with delegates of the program 150 are stored. The payload repositories may be configured based on several operating parameters, such as the amount of buffering (single, double, triple, . . . etc.). It may also maintain thread safety via several possible methods. This functionality may be abstracted by any combination of functional overloads at program run time or compile time. Payloads stored within the repositories of the payload repository area 140 are associated with a logical identifier, which is only required to be unique to the payload repository. This logical identifier is used to map the attributes of the payload (such as size and layout), as well as to map methods and operations associated with the direct and indirect command modules 132 and 134.

The payload repositories, such as the direct payload repository 144, are associated with the following program functions. The direct payload repository 144 may perform a lock buffer swap, (LockBufferSwap(<ThreadID: Optional>)), an unlock buffer swap (UnLockBufferSwap (<ThreadID: Optional>)), a swap receiving stream (SwapReceivingStream(<ThreadID:Optional>)), and a get receiving stream (GetReceivingStream(<ThreadID:Optional>)) function.

The lock buffer swap and unlock buffer swap functions are optional and may be used to guard against acquiring a receiving stream or swapping a receiving stream. These functions may also optionally take an identifier for a thread (threadID) to be used for various synchronization methods. For example, the swap receiving stream function may optionally take a thread identifier for thread safety and may be used in the case of buffered repositories. The get receiving stream function may optionally take a thread identifier for thread safety and is used to acquire a region of program memory in the direct payload repository 144 for which the payload header and payload may be stored.

The payload and the payload header are used in conjunction with each other to allow for storage, retrieval, iteration, and operation on the program state data and commands stored in the payload field. Payloads may be predefined by users or runtime defined as long as the payload header can associate sufficient data to allow the payload to be properly interpreted by the direct and indirect command modules 132 and 134. Payload headers are generated and associated dynamically with one or more payloads. While payloads and their associated headers may be written directly to the associated payload repository, additional methods may be defined that optimize their transfer to the repository. By utilizing streaming CPU instructions or DMA it is possible to build a local copy of the payload header along with the payload itself in a reusable section of program memory that is only cached by the current thread. Once the copy is fully populated it may be streamed to the destination memory of a payload repository for later communication to either direct or indirect command modules 132 and 134.

The payload and payload headers are associated with a push function, which is expressed as Push (<repository>, <PayloadHeader>, <Payload>, <ThreadID:Optional>). Thus the push function stores a payload ID header and associated payload in a payload repository buffer. The following is an example push function given with a streaming instruction:

```
{
    example given with Streaming instructions
    repository.LockBufferSwap( ); // optional
    Repository::Stream receiving_header =
    repository.GetReceivingHeaderStream( ThreadID,
    sizeof(PayloadHeader));
    Repository::Stream receiving_payload =
    repository.GetReceivingPayloadStream( ThreadID,
    sizeof(Payload) );
    CPU_STREAM(receiving_header, PayloadHeader);
    CPU_STREAM(receiving_payload, Payload);
    repository.UnLockBufferSwap( );
}
```

The push function is responsible for taking the payload and payload header and storing them in the program memory storage associated with a payload repository such as the direct payload repository 144 in FIG. 2. As explained above, building the payload and header ID somewhere in fast access CPU memory such as stack memory is preferable as it can then be streamed into the payload repository buffers of the direct payload repository 144.

Figure 7:
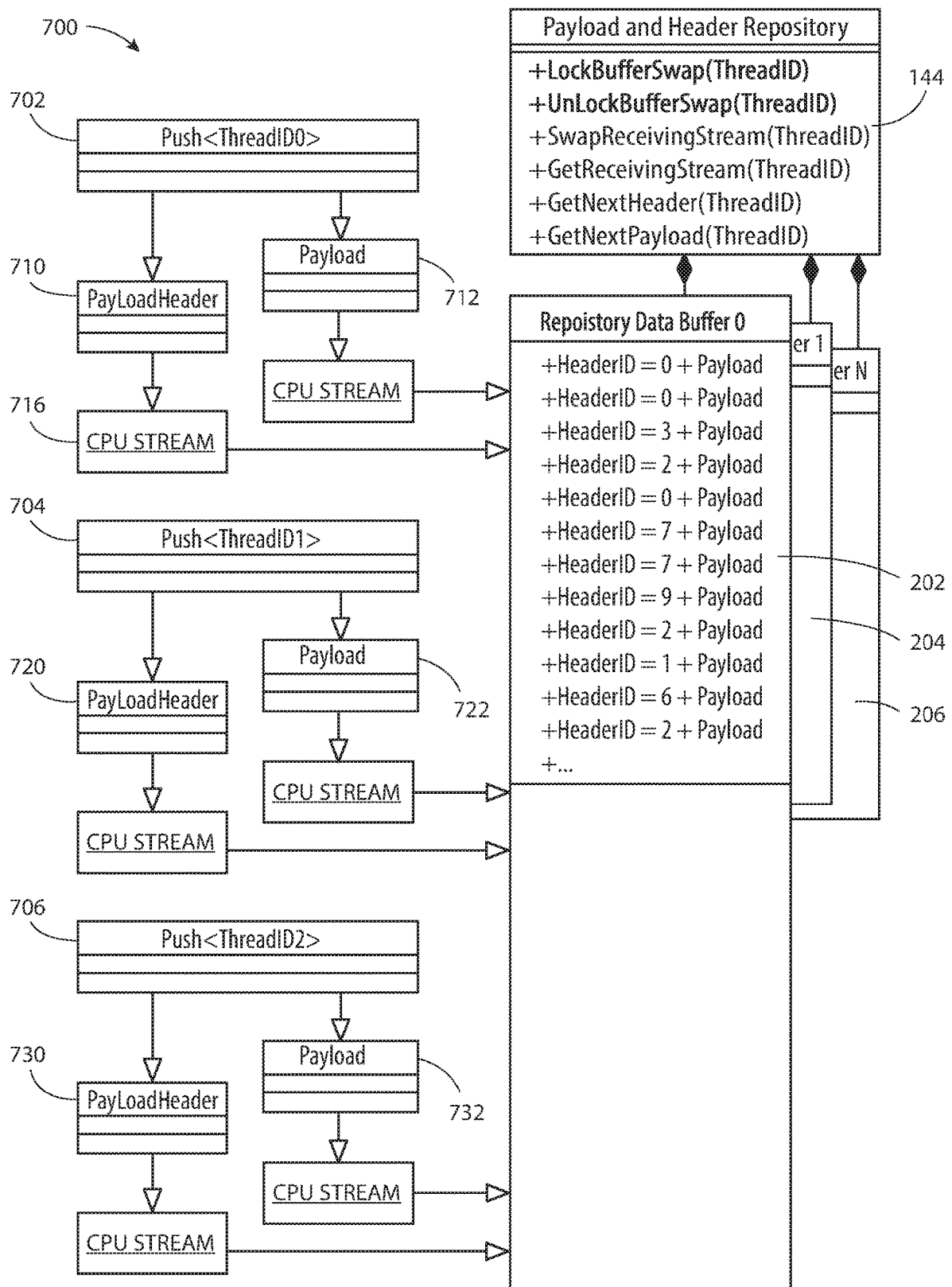
FIG. 7 is a flow diagram showing the sequence of a push function executed by the command system in FIG. 1 using the payload repository.

FIG. 7 shows a flow diagram 700 of the push function. The direct payload repository 144 includes the payload repository buffers 202, 204, and 206 as shown previously in FIG. 2. The push function works with three different threads 702, 704, and 706 in this example. The push function assigns a payload header, such as the payload ID header 710 in the first thread 702 and a corresponding payload 712. The payload 712 and the payload ID header 710 are combined and, using a program stream 716, are streamed into the repository data buffer 202. A second thread 704 is established and inserts another payload ID header 730 and payload 732 into the program stream 720 for storage in the repository buffer 202. The third thread 706 is established and inserts another payload ID header 740 and a payload 742 into the program stream 720 for storage in the repository buffer.

The program flow for an example direct module such as the direct command module 132 may be performed as follows. First a direct module is defined as DirectModule DirectModuleInstance(<repository>). Then the bind delegate command (BindDelegateToPayloadIdentifier( ) is used to associate a delegate with a unique payloadID for the direct module. Each delegate is bound to a payload identifier as follows:
  BindDelegateToPayloadIdentifier(DirectModuleInstance, payloadID0, OnPayloadID0( ));
  BindDelegateToPayloadIdentifier(DirectModuleInstance, payloadID1, UserInstance::OnPayloadID1( ));
  BindDelegateToPayloadIdentifier(DirectModuleInstance, payloadID2, OnPayloadID2( ));
The number of bindings allowed and the binding itself need not be static, and may be changed during execution if needed. During execution, payloads may be stored with the direct payload repository 144 of the direct command module 132 using the push function. This is shown as follows:
  Push(DirectModuleInstance, Payload0, PayloadHeader0);
  Push(DirectModuleInstance, Payload1, PayloadHeader1);
  Push(DirectModuleInstance, Payload2, PayloadHeader2);
  The payloads are then propagated to the delegates during the flush function. The flush function of the direct command module is not required to order the payload propagation, however it may be chosen to by overloading the flush function. While the default would be serial execution of payloads A, B, C, in order, an overloaded Flush( ) function could re-order the execution of payloads if needed. For example, if payload B has higher priority than payload A, the flush function would first propagate payload B, then payload A, then payload C. Or, in another case, payloads A, B, and C could all be propagated on separate threads such that payloads A, B, and C are all executed at the same time.

The program flow for an indirect module such as the indirect command module 134 is similar. First direct modules that will be bound to the indirect module are created. Direct modules may be created and added to the indirect module at any suitable time.
  DirectModule DirectModule0<repository0>;
  DirectModule DirectModule1<repository1>;
  DirectModule DirectModule2<repository2>;
Then the indirect command module 134 is created by the function, IndirectModule IndirectModuleInstance <repository3>. The direct modules may be bound as follows in the below example. In this example, there are three direct modules registered for a first payload (PayloadID0). There is one direct module register for the first payload (PayloadID1):
  RegisterDirectModuleToPayloadIdentifier(IndirectModuleInstance,
    PayloadHeader0,
    DirectModule0,
    DirectModule0::OnPayload0( ),
    DirectModule0::UserData);
  RegisterDirectModuleToPayloadIdentifier(IndirectModuleInstance,
    PayloadHeader0,
    DirectModule1,
    DirectModule1::OnPayload0( ),
    DirectModule1::UserData);
  RegisterDirectModuleToPayloadIdentifier(IndirectModuleInstance,
    PayloadHeader0,
    DirectModule2,
    DirectModule2::OnPayload0( ),
    DirectModule2::UserData);
  RegisterDirectModuleToPayloadIdentifier(IndirectModuleInstance,
    PayloadHeader1,
    DirectModule0,
    DirectModule0::OnPayload1( ),
    DirectModule0::UserData);
Then during execution, payloads can be stored with the indirect payload repository 142 of the indirect command module 134 using the push function:
  Push(IndirectModuleInstance, Payload0, PayloadHeader0);
  Push(IndirectModuleInstance, Payload1, PayloadHeader1);
  Push(IndirectModuleInstance, Payload2, PayloadHeader2);
The flush function allows the payloads to be distributed to the direct modules that have been registered for them. In the previous case, the DirectModules (0, 1 and 2) will all be presented with the payload data of PayloadID0. The DirectModule0 will also be presented with the payload data of PayloadID1. Since there are no registered direct modules for PayloadID2, it will not be broadcast at all.

The advantage of the system 100 is to limit the reads by the processor unit 102 from the external memory 110 to the cache memory 122. Communication of needed program state data and commands to delegates is facilitated by minimizing the time of polling since only the requested payloads are flushed to registered modules and delegates, thereby eliminating the need for polling for information. Eliminating the need for polling to determine whether new data exists or not reduces the pressure on the processor cache 122 and external memory 110.

The translation of the payload header using the tables allows direct writing efficiently without rewriting payload data from external memory 110 for a delegate.

The push function takes the payloads and associated payload headers and streams them into a memory location thus avoiding the computationally expensive task of polling all of the external memory 110 for the required data. The access to the cache memory 122 is limited to the flush functions. Since the delegates are deferred in execution, the data used for each delegate is prevented from contending with other threads.

Figure 8:
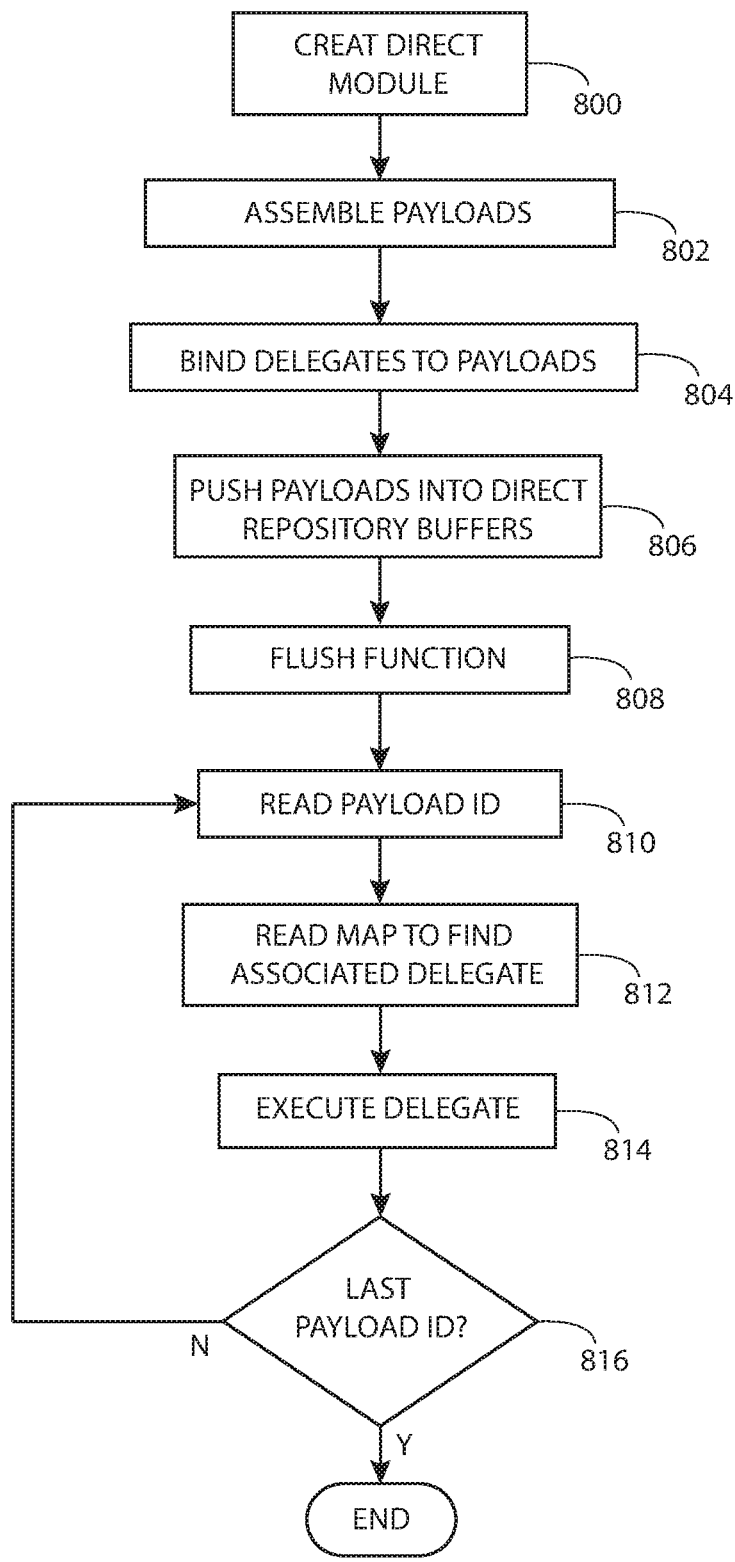
FIG. 8 is a flow diagram showing the operation of the command system in FIG. 1 to initiate a direct module for binding delegates and execution of the delegates.

The process of scheduling worker threads for tasks may be controlled on the example system 100 will now be described with reference to FIGS. 1-7 in conjunction with the flow diagram shown in FIG. 8. The flow diagram in FIG. 8 is representative of example machine readable instructions for assembling payloads and associating them with delegates from a program such as the program 150. In this example, the machine readable instructions comprise an algorithm for execution by: (a) a processor, (b) a controller, and/or (c) one or more other suitable processing device(s) such as a GPU. The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces could be implemented by software, hardware, and/or firmware. Also, some or all of the machine readable instructions represented by the flowchart of FIG. 8 may be implemented manually. Further, although the example algorithm is described with reference to the flowcharts illustrated in FIG. 8, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 8 is a flow diagram of process executed by the command system 130 to assemble payloads and associated delegates for execution on the processor unit 102 in FIG. 1. A direct module is created based on a group of delegates from the functions of a program such as the program 150 in FIG. 1A (800). The payloads are assembled based on delegates in a program having a payload header ID with payloads of either state data or command data (802). The bind delegate function is then executed by the direct command module 132 to create the map between payloads and delegates (804). The push function is then used to move data in the payloads to the respective payload repositories by the direct command module (806).

On executing a delegate, the flush function is run (808) that iterates through all of the payloads in the payload repository buffers and makes the payloads available to the delegates as they are executed. The flush function reads the payload ID of the first payload (810). The flush function uses the map 210 to determine the associated delegate for the payload (812). The delegates are then executed with the loaded payloads containing the commands and state data needed to execute the delegates (814). The flush function then determines whether the payload ID is the last payload in the payload repository buffer (816). If the payload repository includes more payloads, the flush function loops back and reads the next payload ID (810). If the payload repository does not include any more payloads, the flush function concludes.

Each of these embodiments and obvious variations thereof is contemplated as falling within the spirit and scope of the claimed invention, which is set forth in the following claims.

What is claimed is:

1. A multi-core processing system for efficient execution of program functions distributed among a plurality of threads associated with a plurality of processor units, the system comprising:
   a plurality of processor units, including a processor unit comprising a processor and a cache memory;
   an external memory coupled to each of the plurality of processor units, the external memory including a direct payload repository comprising at least one repository buffer; and
   a direct command module to allow access to the direct payload repository by the processor unit to work asynchronously with a plurality of program delegates, wherein the direct command module is configured to:
   access the plurality of program delegates and build a payload header map that associates a payload with a program delegate;
   iterate through one or more payloads stored in the direct payload repository, including the payload associated with the program delegate; and,
   provide access to the payload, based on the payload header map, by the processor when the program delegate is to be executed by the processor unit, bypassing access to the cache memory.

2. The multi-core processing system of claim 1, wherein the processor is configured to execute a first thread and a second thread, and the program delegate is executed via the first thread and another program delegate of the plurality of program delegates is executed via the second thread.

3. The multi-core processing system of claim 2, wherein the program delegate and said another program delegate are executed simultaneously.

4. The multi-core processing system of claim 1, wherein the direct command module is configured to bind the payload to the program delegate.

5. The multi-core processing system of claim 1, wherein the direct command module is configured to unbind one or more of the plurality of program delegates from a header of the payload.

6. The multi-core processing system of claim 1, wherein each of the plurality of program delegates is prioritized based on a capacity of the cache memory.

7. The multi-core processing system of claim 1, wherein each of the plurality of program delegates is prioritized based on a bandwidth of the cache memory.

8. The multi-core processing system of claim 1, wherein the external memory includes an indirect payload repository having an indirect payload repository buffer, and the system further comprising:
   an indirect command module that stores an indirect to direct translation map that includes the direct command module, wherein the payload is streamed from the indirect payload repository to the direct payload repository based on the indirect to direct translation map.

9. A method for efficiently executing a program having a plurality of program delegates by a multi-core processing system having a plurality of processor units, including a processor unit comprising a processor and a cache memory, and an external memory coupled to each of the plurality of processor units, the method comprising;
   providing a direct command module based on the plurality of program delegates;
   assembling a plurality of payloads used by one or more of the plurality of program delegates;
   building, by the direct command module, a payload header map that associates each of the plurality of payloads to the one or more of the plurality of program delegates;
   moving, by the direct command module, the plurality of payloads to respective payload repositories in the external memory;
   iterating, by the direct command module, through each of the plurality of payloads; and,
   providing, by the direct command module, access to at least one of the plurality of payloads by the processor, based on the payload header map, when an associated program delegate is to be executed by the processor, bypassing access to the cache memory.

10. The method of claim 9, wherein the modified execution order is based on a priority of each of the plurality of program delegates.

11. The method of claim 9, wherein the processor is configured to execute a first thread and a second thread, and the associated program delegate is executed via the first thread and another program delegate of the plurality of program delegates is executed via the second thread.

12. The method of claim 11, wherein the associated program delegate and said another program delegate are executed simultaneously.

13. The method of claim 9, wherein the building the payload header map comprises binding the at least one of the plurality of payloads to the associated program delegate.

14. The method of claim 9, the method further comprising unbinding one or more of the plurality of program delegates from a header of a payload.

15. The method of claim 9, wherein each of the plurality of program delegates is prioritized based on a capacity of the cache memory.

16. The method of claim 9 wherein each of the plurality of program delegates is prioritized based on a bandwidth of the cache memory.

17. The method of claim 9, wherein the external memory includes an indirect payload repository having an indirect payload repository buffer, and wherein the moving the plurality of payloads to respective payload repositories in the external memory comprises streaming at least one of the plurality of payloads from the indirect payload repository to a corresponding one of the respective payload repositories.

18. The method of claim 9, further comprising executing the plurality of program delegates by the multi-core processing system, including:

执行 a first program delegate of the plurality of program delegates via a first thread of the multi-core processing system; and executing a second program delegate of the plurality of program delegates via a second thread of the multi-core processing system.

19. The method of claim 18, wherein the first program delegate and the second program delegate are executed simultaneously.

20. A non-transitory computer readable medium having stored thereon instructions for executing a program having a plurality of program delegates by a multi-core processing system having a plurality of processor units, including a processor unit comprising a processor and a cache memory, and an external memory coupled to each of the plurality of processor units, the program comprising performing the operations of:

providing a direct command module based on the plurality of program delegates;

assembling a plurality of payloads used by one or more of the plurality of program delegates;

building, by the direct command module, a payload header map that associates each of the plurality of payloads to the one or more of the plurality of program delegates;

moving, by the direct command module, the plurality of payloads to respective payload repositories in the external memory;

iterating, by the direct command module, through each of the plurality of payloads; and, providing, by the direct command module, access to at least one of the plurality of payloads by the processor, based on the payload header map, when an associated program delegate is to be executed by the processor, bypassing access to the cache memory.

* * * * *